A. BRIDGES.

Car-Springs.

No. 6,049.

Reissued Sept. 15, 1874.

Witnesses

R. P. Clark.

J. S. MacKenzie

Inventor

Albert Bridges

By J. E. Fitch

UNITED STATES PATENT OFFICE.

ALBERT BRIDGES, OF NEW YORK, N. Y., ASSIGNOR TO HIMSELF AND ALFRED BRIDGES.

IMPROVEMENT IN CAR-SPRINGS.

Specification forming part of Letters Patent No. 36,050, dated July 29, 1862; reissue No. 6,049, dated September 15, 1874; application filed March 4, 1874.

*To all whom it may concern:*

Be it known that I, ALBERT BRIDGES, of the city, county, and State of New York, have invented a certain new and useful Improvement in Railroad-Car Springs and Trucks; and I do hereby declare that the following is a full and exact description of the same.

My invention relates to railroad-car springs; and consists in so combining one or more bars of steel with the body and axle or axles of a car-truck that the said bar or bars of steel act by their torsion instead of their flexure or bending as a spring between the said body and axle or axles.

The accompanying figures form a part of this specification.

Figure 1:
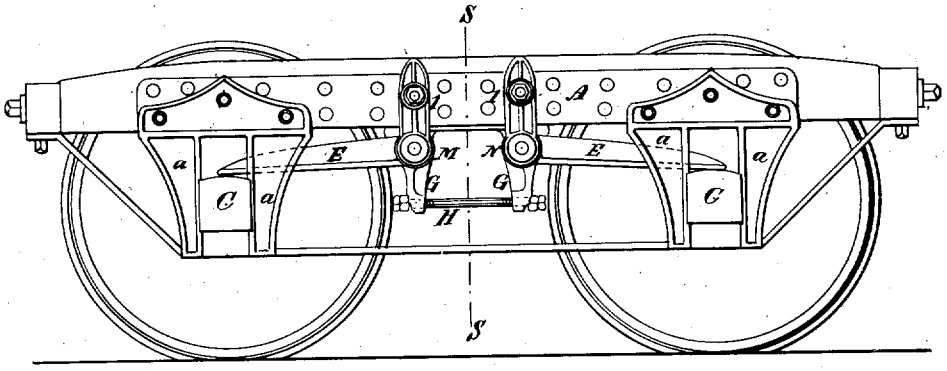
Figure 2:
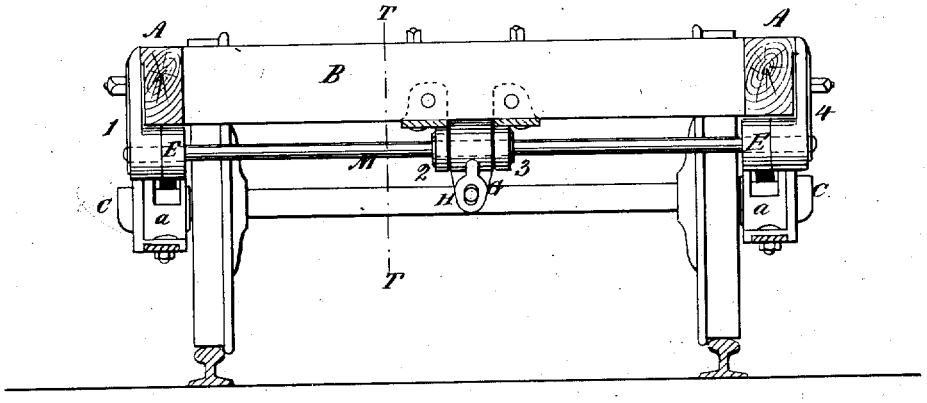
Figure 3:
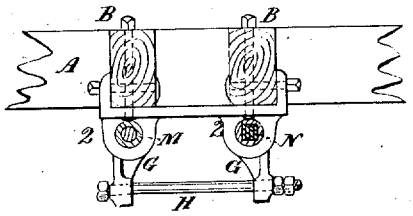

Figure 1 represents a side elevation of my truck. Fig. 2 represents a cross-section on line S S. Fig. 3 represents a portion of a longitudinal section on the line T T.

The wood-work of my truck and the relation of the truck to the car which it is to support differ little, if at all, necessarily, from the ordinary construction.

A represents what I term the truck-beams, and B the bearing-beams, between which the bolster may be supported, upon springs or otherwise, in the ordinary manner. Ordinary jaws *a a*, bolted to A, guide the boxes C of the axles, as usual. M N are the springs. The material is well-tempered steel, and the action is torsional or twisting, whereby all portions of the bar are subject to an equal amount of strain, and whereby the entire spring may be worked to its fullest capacity before any part shall break or set.

The preferable form of these springs is that of shafts or bars extending continuously across the truck. Each may be free to turn in four bearings or brackets, 1 2 3 4, and each may be rigidly fixed, by suitable keys or otherwise, to three arms or levers, E F G, the arms E and F being near the opposite ends of the shaft, and the arm G being at the center, their proper relative positions when in place bearing the load being shown in the figures.

The end brackets 1 and 4, when used, are bolted or otherwise firmly fixed to the truck-beams A. They may be cast or otherwise connected together in such manner that the bracket 1 of the spring M shall brace and support the corresponding bracket 1 of the spring N, if desired. The center brackets 2 and 3, when used, are bolted or otherwise firmly fixed to the bearing-beams B. They may be cast together, as represented in Fig. 3, so that the bracket 2 of the spring M shall brace and support the corresponding bracket 2 of the spring N, whereby the strain tending to draw together these brackets is resisted. With the unity of the parts as thus constituted, the bearing-beams have simply to support the trifling weight of the parts, the entire horizontal strain due to the action of the shafts or springs M N being supported by the rigidity of the casting 2 2. H is a stout bolt with a stout nut and jam-nut, which connects the lower extremities of the arms G G′, as represented. This construction and arrangement of the several parts allows the bolt H to move horizontally forward or backward as the shafts M N rock in their central bearings 2 and 3, so that the entire apparatus acts as an equalizing-lever between the car-axles—that is to say, if one axle lifts to surmount any obstruction on the track, or in passing any inequality, the springs—not of that axle alone, but of both that and the other axle—contribute their elasticity to soften the shock.

The construction and arrangement of the several parts, as represented, also allow the tension of all the springs to be simultaneously increased and diminished at pleasure by simply operating the nut and jam-nut on the bolt H. The set of the springs may thus be readily adjusted.

I have thus described what I regard as the preferable form and arrangement of my torsional car-spring; but it may be round, as represented by M, or square, as represented by N, or may be flattened to any desired extent; or it may, if convenient, be made in a square or other form, by applying together a number of thin plates of proper width, each produced and tempered separately. This latter construction is preferable for some reasons, and is represented by the vertical lines across N, in Fig. 3.

If it be desired, as is frequently the construction of said cars and trucks, to allow the king-pin of the car to project down through the center of the truck to a lower level than the bolt H, it can be allowed without any disarrangement of my several parts by simply substituting a suitable slotted bar or a large yoke in the place of the straight bolt H. In such case the king-pin is allowed to extend down through the slot or yoke, and both ends of the latter are adapted to receive nuts and jam-nuts, or some equivalent means of securing them after their insertion through the arms G.

Having now fully described my invention, what I claim as new therein, and desire to secure by Letters Patent, is—

1. A railway-car spring composed of a bar of steel and an arm formed on or connected therewith, whereby the action of the spring is by torsion of the bar, as and for the purpose described.

2. The adjustable torsional apparatus consisting of the connection H, in combination with the brackets 1 2 3 4 and levers E F G, as set forth.

3. The torsional springs M N, in combination with arms G E F, applied to a car-truck so that the equalizing effect shall be obtained, substantially as described.

Witness my hand this 2d day of March, 1874.

ALBERT BRIDGES.

Witnesses:
B. S. CLARK,
WM. G. BUSSEY.